United States Patent
Föhl

[19]

[11] Patent Number: 5,290,062
[45] Date of Patent: Mar. 1, 1994

[54] PRETENSIONER IN A SAFETY BELT SYSTEM FOR VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 838,372

[22] Filed: Feb. 19, 1992

[30] Foreign Application Priority Data
Feb. 20, 1991 [EP] European Pat. Off. ........... 91102404

[51] Int. Cl.⁵ ............................................. B60R 21/00
[52] U.S. Cl. .............................. 280/801 R; 297/480
[58] Field of Search ............... 280/801, 806; 297/474, 297/480

[56] References Cited
U.S. PATENT DOCUMENTS
4,913,497 4/1990 Knabel et al. ................. 280/806 X
5,169,173 12/1992 Nishizawa .......................... 280/806

FOREIGN PATENT DOCUMENTS
420664 4/1991 European Pat. Off. ........... 280/806

*Primary Examiner*—Joseph D. Pape
*Attorney, Agent, or Firm*—Tarolli, Sundheim & Covell

[57] ABSTRACT

In a pretensioner for safety belt systems in vehicles a mechanical drive having a pretensioned spring is provided. The spring is held by a trigger mechanism in its pretensioned state. For initiating a tightening operation the spring is released by the trigger mechanism. The vehicle-sensitive sensor mass of said trigger mechanism is formed substantially by the mass of the spring itself, that of a piston and a detent lever and the smaller mass of a guide tube which receives the spring and is guided translationally displaceably relatively to a common support structure of the pretensioner drive and of a fitting of the safety belt system.

19 Claims, 3 Drawing Sheets

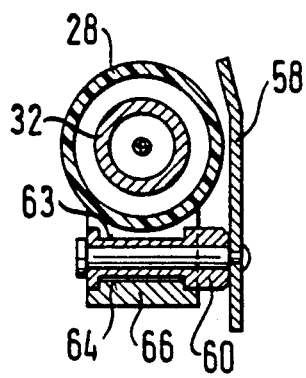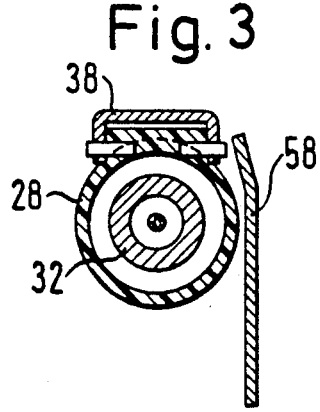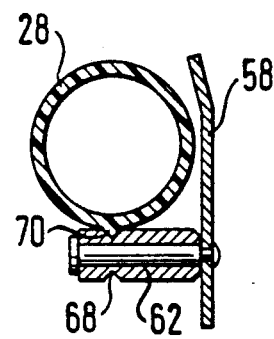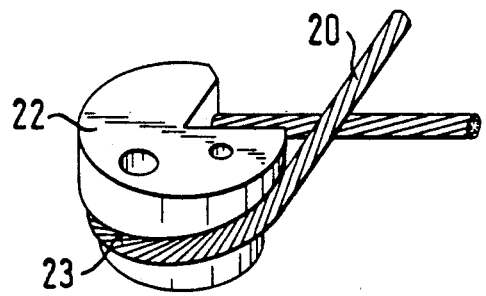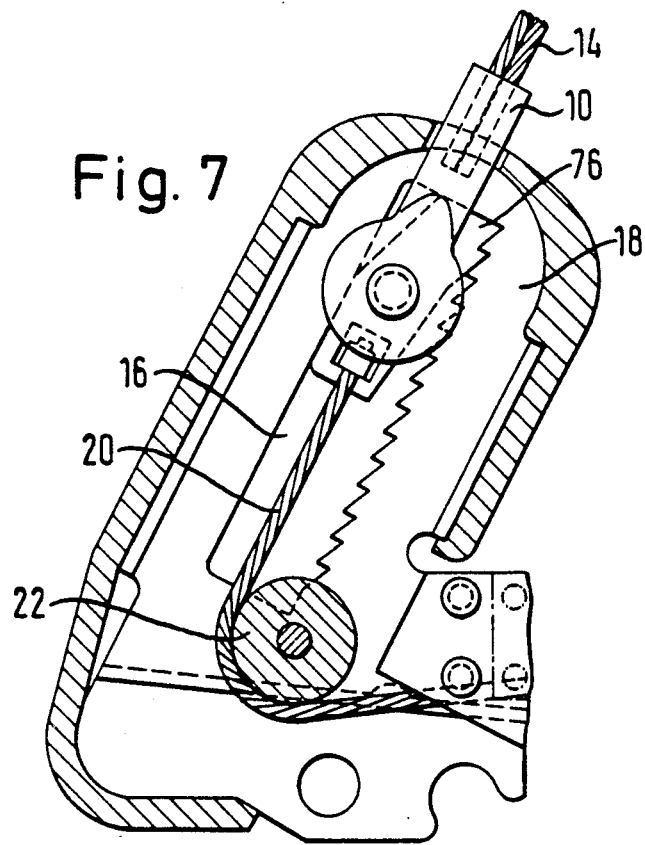

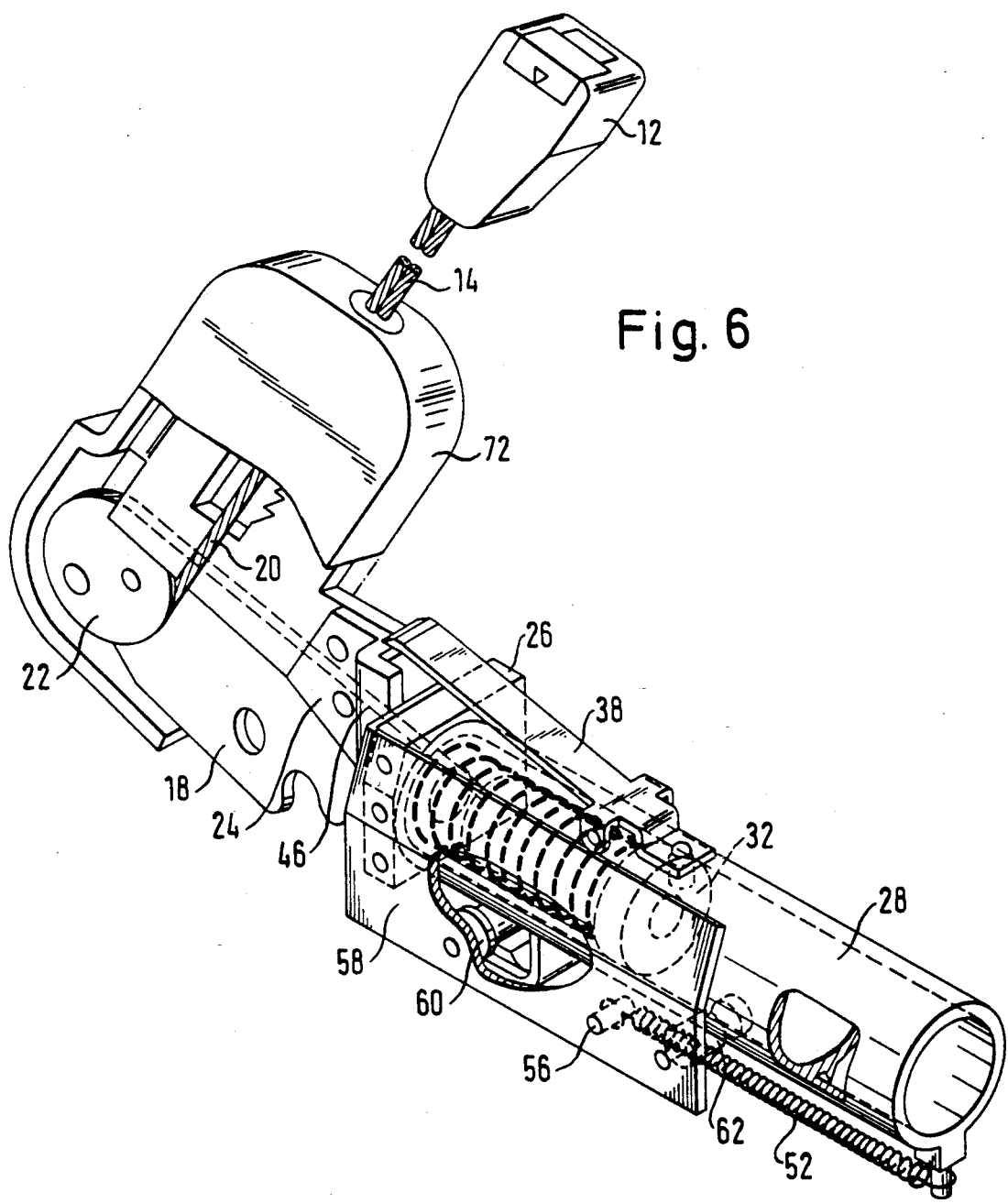

PRETENSIONER IN A SAFETY BELT SYSTEM FOR VEHICLES

The invention relates to a pretensioner in a safety belt system for vehicles comprising a mechanical drive which has a biased helical spring and engages a fitting of the safety belt system, and a trigger mechanism which holds a spring in its biased state and in vehicle-sensitive manner releases said spring to initiate a pretensioning operation.

The effectiveness of pretensioner for protecting vehicle occupants in a collision is an established fact. Broad use of pretensioners in vehicles, in particular motor vehicles, is prevented only by the high expenditure involved. Considerable savings compared with pretensioners having a pyrotechnical drive are obtained by using mechanical drives in which a force accumulator in the form of a spring held under tension is used, said spring abruptly relaxing in a pretensioning operation. The spring is held in its tensioned state of rest by a trigger mechanism. The trigger mechanism includes a vehicle-sensitive mass which forms for example a pendulum which responds to vehicle decelerations and when a predetermined release criterion is reached activates the trigger mechanism so that the latter releases the spring.

The invention provides a pretensioner with a mechanical drive and distinguished by simplicity, low costs, compact construction and high triggering accuracy.

In the pretensioner according to the invention the spring forms an essential part of the sensor mass of the trigger mechanism. Since the spring represents the sole source of force for the pretensioning operation and must be correspondingly strongly dimensioned, it has a considerable mass. Along with the mass of further components coupled to the spring, this mass can be used to detect and measure vehicle deceleration. The spring is a helical spring and accommodated in a guide tube which is mounted translationally displaceable in the axial direction relatively to a housing fixed with respect to the vehicle and is biased by spring tension into a rest position. The release sensitivity can be set by the dimensioning of said spring tension. The translational displacement of the guide tube relatively to the housing is a measure of the vehicle deceleration which has occurred. The translational displacement of the guide tube with the tensioned spring accommodated therein against the spring tension defining the release threshold corresponds to an integration of the deceleration values which have occurred with respect to time. The release takes place as soon as the guide tube has undergone a displacement over a distance of predetermined magnitude relatively to the housing.

Further features and advantages of the invention will be apparent from the following description and from the drawings, to which reference is made and in which:

FIG. 2 is a section along the plane II—II of FIG. 1;

FIG. 3 is a section along the plane III—III of FIG. 1;

FIG. 4 is a section along the line IV—IV of FIG. 1;

FIG. 5 is a perspective view of a cable deflection element for the embodiment shown in FIG. 1;

FIG. 6 is a partially cut-away perspective view of the pretensioner; and

FIG. 7 is a partial view shown in section of a second embodiment of the pretensioner.

Figure 1:
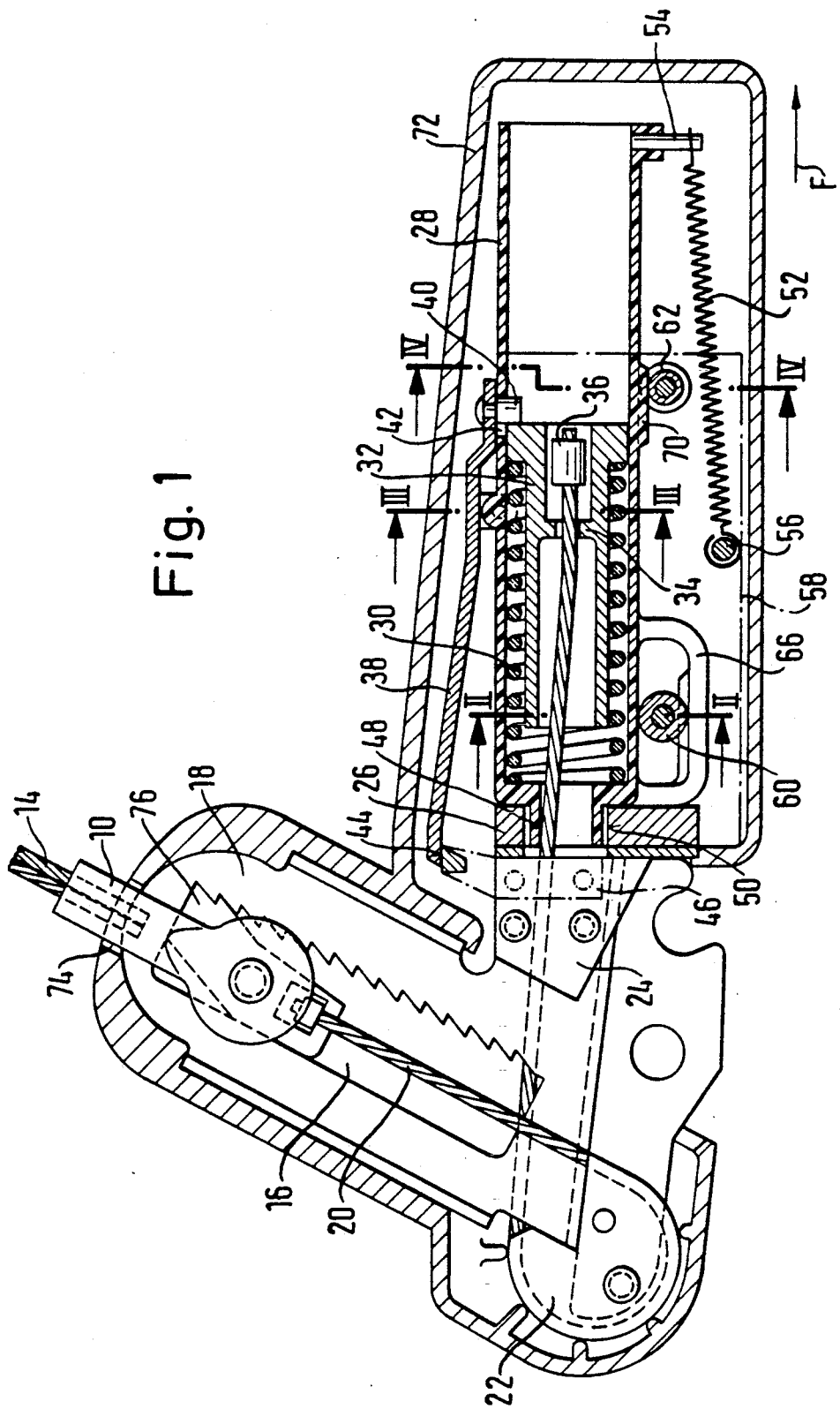
FIG. 1 is a schematic sectional view of an embodiment of the pretensioner engaging a belt buckle of the safety belt system.

In the constructional forms of a pretensioner described here the mechanical drive engages the anchoring fitting of a belt buckle of the safety belt system via a pulling cable. The anchoring fitting denoted by 10 to which the belt buckle 12 is connected via a cable loop 14 is displaceably guided in a rectangular recess 16 of a mounting plate 18 dimensioned to bear loads and to be secured to the vehicle body. Connected to the anchoring fitting 10 is a pulling cable 20 which is led via a deflecting element 22 to a drive which will now be described in detail.

The mounting plate 18 forms with a support plate 26 connected to its lower end via an angle piece 24 a common support structure for the drive and the anchoring fitting 10. The drive includes a helical spring 30 accommodated in compressed state in a guide tube 28. The helical spring 30 bears with its end adjacent the support plate 26 on the bottom of the guide tube 28; the opposite end of the helical spring 30 bears on a step, facing the support plate 26, of a sleeve-like piston 32 which is slidingly received in the interior of the guide tube 28. The pulling cable 20 extends into the interior of the sleeve-like piston 32 and through a bore in an intermediate wall 34 in the interior of the piston 32. A stop block 36 is pressed onto the end of the pulling cable 20.

The helical spring 30 is held in the tensioned state in the guide tube 28 by means of a detent lever 38. Said detent lever 38 is made two-armed and is pivotally mounted on the guide tube 28. At the end of the short arm of the detent lever 38 a holding nose 40 is formed which projects through an opening 42 in the wall of the guide tube 28 into the interior thereof and engages the surface of the piston 32 remote from the helical spring 30. The long arm of the detent lever 38 bears with its free bevelled end on a holding surface 44 which is formed on the one wedge-shaped end face of a stirrup member 46 secured laterally to the angle piece 24. The pivot axis of the detent lever 38 lies radially outside the engagement surface of the holding nose 40 on the end face of the piston 32. As a result, at the detent lever 38 a moment arises which is caused by the tension of the helical spring 30 and which tends to pivot the detent lever 38 anticlockwise. A so called opening moment thus arises at the detent lever 38. By this opening moment the free end at the long arm of the detent lever 38 is pressed against the holding surface 44 of the stirrup member 46.

On its end adjacent the support plate 26 the guide tube 28 has an axial cylindrical extension 48 of reduced outer diameter which engages with radial spacing into a bore 50 of the support plate 26. The transition between the axial extension 48 and the remaining part of the guide tube 28 forms a radial shoulder which is in engagement with the adjacent surface of the support plate 26. The guide tube with the helical spring 30 accommodated therein is biased into this rest position shown in FIG. 1 by a tension spring 52 which is attached between a pin 54 secured to the free end of the guide tube 28 and a further pin 56 which is anchored to a holding plate 58 which in turn is secured to the support plate 26. Two roller bodies 60, 62 are rotatably mounted on said holding plate 58. The roller body 60 is formed by a roller provided at its outer periphery with a wide annular groove 63 (FIG. 2). A rib 64 of a guide web 66 connected to the outer side of the guide tube 28 engages into said annular groove 63 with slight play. The roller body 62 is also formed by a roller which comprises an annular groove 68 at its outer periphery. An axial rib 70 formed on the outer wall of the guide tube 28 engages into said groove 68 with slight play (FIG. 4). Thus, the guide tube 28 is supported by the roller bodies 60, 62 both in the radial direction and transversely to the radial direction and to execute a translational displacement in the axial direction is mounted in low-friction manner on the support structure formed by the mounting plate 18, the support plate 26 and the holding plate 58.

The entire drive is surrounded with the mounting plate 18 by a housing 72 which is provided with a passage opening 74 for the anchoring fitting 10.

The mode of operation of the pretensioner will now be described.

The entire assembly shown in FIG. 1 is installed in the vehicle in such a manner that the end face of the piston 32 points in the travelling direction; the normal travelling direction is indicated in FIG. 1 by an arrow F. On a vehicle deceleration the guide tube 28 with the helical spring 30 accommodated therein tends to execute a translational displacement in the travelling direction against the spring tension of the tension spring 52. The threshold at which a translational displacement of the guide tube 28 takes place is defined by the dimensioning of the spring tension of the tension spring 52.

On the lateral displacement of the guide tube 28 the detent lever 38 is also translationally displaced, the free end at the long arm of the detent lever 38 sliding over the holding surface 44 of the stirrup member 46. After a translational movement of the guide tube 28 of a few millimeters the free bevelled end of the detent lever 38 moves beyond the end edge of the holding surface 44. The inclined face formed by the bevelling at the free end of the detent lever 38 now engages beneath the yielding inclined face which is formed by the wedge shape at the end face of the stirrup member 46 and allows an unrestricted further movement of the detent lever 38. The detent lever 38 can therefore yield without restriction to the pressure of the helical spring 30 exerted via the piston 32 on the detent nose 40 so that said lever is suddenly released and executes an anticlockwise pivoting. The helical spring 30 now relaxes abruptly and firstly moves the guide tube 28 into engagement with the support plate 26, the free end of the detent lever 38 moving under the rearwardly extending inclined face adjoining the holding surface 44 and then moving the piston 32 in the guide tube 28 in the direction away from the support plate 26. At the same time, a tension is exerted on the pulling cable 20 and is transmitted via the deflecting element 22 to the anchoring fitting 10. The latter is moved in the rectangular recess 16 of the mounting plate 18 inclined to the vehicle floor, the belt buckle 12 also being entrained to take up any belt slack in the safety belt system. A subsequent return movement of the anchoring fitting 10 is prevented by a ratchet mechanism which is formed by a detent member 76 pivotally mounted on the anchoring fitting 10 and a detent toothing which is formed on one longitudinal side of the recess 16 and against which the detent member 76 is biased by a spring.

In the trigger mechanism of the pretensioner described above the combined mass of the helical spring 30, the piston 32, the detent lever 38 and the guide tube 28 is used as vehicle-sensitive sensor mass. Of these components, the helical spring 30 has by far the greater mass; the guide tube 28 may consist of a material of low weight, for example plastic. If it is remembered that a trigger mechanism with a vehicle-sensitive sensor mass must generate considerable release forces in order to be able to release a helical spring 30 subjected to a high pretensioning of for example 2000 N at an exactly and reproducibly predefined vehicle deceleration value, it will be clear that the omission of a separate vehicle-sensitive mass results in a considerable saving in weight and overall size. The trigger mechanism described even allows considerable component and assembly tolerances because the translational displacement of the guide tube 28 necessary for the initiation can be made relatively large, of the order of magnitude of a few millimeters. Due to the low-friction easy moving mounting of the guide tube 28 reliable return thereof to its rest position is achieved by the tension spring 52 if the vehicle deceleration does not reach the release threshold value and thereafter decreases again. To ensure that the pulling cable 20 does not obstruct the translational displacement of the guide tube 28 the stop block 36 is arranged at a distance from the intermediate wall 34 which is greater than the movement distance of the guide tube 28 up to the release. This movement distance is equal to the axial length with which the free end of the detent lever 38 bears on the holding surface 44. The axial length of the extension 48 of the guide tube 28 is also dimensioned greater than said movement distance.

A greater or lesser deflection of the pulling cable 20 is necessary in accordance with the installation in the vehicle. In the embodiment shown in FIG. 1 the deflecting element 22 shown separately in FIG. 5 is constructed as a part which is fixedly attached to the mounting plate and which is provided on its partially cylindrical peripheral surface with a coiled guide face 23 in the form of a stop shoulder or groove against or in which the pulling cable 20 is guided. This configuration permits a deflection of the pulling cable 20 with a wrap angle of appreciably more than 180°. In the embodiment illustrated in FIG. 1 the wrap angle on the deflecting element 22 is almost 240°.

In the embodiment illustrated in FIG. 7 the deflecting element 22 is constructed as roller rotatably mounted on the mounting plate 18.

In every case a low-loss deflecting of the pulling cable 20 is advantageous. With a deflecting element fixedly attached to the mounting plate 18 of the type shown in FIG. 5 friction-reducing steps are therefore advantageous, for example a favourable material pairing or the use of special friction-reducing substances.

In further embodiments not shown in the drawings the mounting plate 18 is dispensed with because the drive is fixedly installed in the vehicle as separate assembly. The pulling cable is deflected between the drive and engagement point in accordance with the requirements and the installation situation. In the embodiment described the anchoring fitting 10 represents said engagement point. Constructions are however also provided in which the drive engages in particular on the retractor shaft of a belt retractor.

I claim:

1. A pretensioner in a safety belt system for a vehicle, comprising a support structure adapted to be fixed to the body work of said vehicle, a mechanical drive having a helical spring and a trigger mechanism adapted to maintain said spring in a compressed state and to release said spring in response to vehicle deceleration to initiate a pretensioning operation, said spring being accommodated in a guide tube which is mounted to be translationally displaceable in a first axial direction of said guide tube with respect to said support structure, and spring biasing means being provided for biasing said guide tube in a second direction opposite said first direction towards a rest position.

2. The pretensioner according to claim 1, wherein said guide tube is mounted on low-friction roller bodies on said support structure.

3. The pretensioner according to claim 2, wherein said support structure is provided with a shoulder forming a stop for defining said rest position of the guide tube.

4. The pretensioner according to claim 3, wherein said support structure has a wall wherein a bore is provided, said guide tube comprising a main section and an axial extension of reduced diameter which in said rest position of the guide tube engages into said bore in the wall of said support structure, a radial step being formed between said extension and the main section of said guide tube, said radial step being in abutment against said wall.

5. The pretensioner according to claim 2, wherein said roller bodies support and guide said guide tube both radially and laterally of said guide tube.

6. The pretensioner according to claim 1 wherein said helical spring has a first end bearing on a radial flange of said guide tube and a second end urging on a piston displaceably received in said guide tube, said trigger mechanism comprising a detent lever engaging said piston.

7. The pretensioner according to claim 6, wherein said detent lever is pivotally mounted on the guide tube.

8. The pretensioner according to claim 7, wherein said detent lever has a first longer arm and a second shorter arm, said second arm having a holding noise and said first arm having a free end bearing on a holding surface of said support structure.

9. The pretensioner according to claim 8, wherein said free end of said first longer arm of the detent lever, on translational displacement of the guide tube, slides over said holding surface until it passes beyond an edge thereof, said detent lever then being pivoted under the action of the compressed helical spring until said holding nose releases said piston.

10. The pretensioner according to claim 9, wherein said detent lever has a pivot axis positioned so that said lever is biased by force developed by said helical spring in a direction moving said holding nose away from said piston.

11. The pretensioner according to claim 9, wherein the free end of said first longer arm of the detent lever is bevelled and said end edge of the holding surface is adjacent to a rearwardly extending inclined face.

12. The pretensioner according to claim 1, wherein said helical spring engages a pulling cable which is connected to a fitting of the safety belt system.

13. The pretensioner according to claim 12, wherein said pulling cable is operatively associated with said piston for engagement therewith.

14. The pretensioner according to claim 12, wherein said fitting is displaceably guided in a direction towards the vehicle floor, said fitting being connected to a buckle of the safety belt system and said pulling cable being guided via a deflecting means.

15. The pretensioner according to claim 14, wherein said deflecting means comprises at least one deflecting roller rotatably mounted on said support structure.

16. The pretensioner according to claim 14, wherein said deflecting means is formed by a guide member which is fixedly attached to the support structure and which comprises a spiral guide surface formed in its peripheral surface for the pulling cable.

17. The pretensioner according to claim 16, wherein said pulling cable is deflected by said guide member by an angle exceeding 180°.

18. The pretensioner according to claim 1, wherein said drive forms an independent assembly which is fixedly incorporated in the vehicle and which is connected to a fitting of the belt system via a deflected pulling cable.

19. A safety restraint system for a vehicle, said system comprising:
a buckle means for connection with a safety belt;
a pretensioner for moving said buckle means and the safety belt during a pretensioning stroke, said pretensioner including:
a mounting means for fixed connection to the vehicle;
a drive means for providing a force to move the buckle during the pretensioning stroke; and
a trigger means for holding said drive means in a state of readiness prior to the pretensioning stroke and for releasing said drive means to permit the pretensioning stroke in response to a vehicle deceleration, said trigger means including an inertial mass means for movement relative to said mounting means in response to a deceleration force;
said drive means including a spring;
said inertial mass means including said spring and a spring guide tube, said spring being mounted in said spring guide tube.

* * * * *